United States Patent
Chimura et al.

(10) Patent No.: US 11,210,152 B2
(45) Date of Patent: Dec. 28, 2021

(54) ERROR SOLUTION INFORMATION PROVIDING SYSTEM, ERROR SOLUTION INFORMATION PROVIDER APPARATUS, AND ELECTRONIC APPARATUS

(71) Applicant: KYOCERA DOCUMENT SOLUTIONS INC., Osaka (JP)

(72) Inventors: Tetsuyuki Chimura, Osaka (JP); Masaaki Aiba, Osaka (JP); Tomoki Oyasato, Osaka (JP); Tomoyuki Izumi, Osaka (JP); Naoki Yoshida, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 21 days.

(21) Appl. No.: 16/830,464

(22) Filed: Mar. 26, 2020

(65) Prior Publication Data
US 2020/0310902 A1   Oct. 1, 2020

(30) Foreign Application Priority Data
Mar. 27, 2019   (JP) .............................. JP2019-060099

(51) Int. Cl.
G06F 11/00 (2006.01)
G06F 11/07 (2006.01)
G06F 11/34 (2006.01)

(52) U.S. Cl.
CPC ...... *G06F 11/0733* (2013.01); *G06F 11/0775* (2013.01); *G06F 11/3476* (2013.01)

(58) Field of Classification Search
CPC ............. G06F 11/0733; G06F 11/0775; G06F 11/3476; G06F 11/079; G06F 11/0766; G06F 11/0787; G06F 11/3013
See application file for complete search history.

(56) References Cited

U.S. PATENT DOCUMENTS

| 2008/0294423 | A1* | 11/2008 | Castellani ........... G06F 11/0793 704/4 |
| 2009/0287962 | A1* | 11/2009 | Bakekolo ............ G06F 11/0706 714/38.14 |
| 2011/0185220 | A1* | 7/2011 | Foley .................. G06F 11/0784 714/2 |

(Continued)

FOREIGN PATENT DOCUMENTS

JP    2013045200 A    3/2013

*Primary Examiner* — Joseph D Manoskey
(74) *Attorney, Agent, or Firm* — Li & Cai Intellectual Property (USA) Office

(57) ABSTRACT

An electronic apparatus is configured to, in a period from returning from an energy-saving mode to determining to change to the energy-saving mode, capture screenshot data every time the first controller circuit detects input from a user into the input device, the screenshot data being data of a screen displayed on the first display device, determine an error code, the error code identifying an error that occurred in the period, and generate a screenshot log and store the screenshot log in the first storage device, the screenshot log including a series of the screenshot data in the period and the error code identifying the error that occurred in the period, receive the screenshot log send request from the error solution information provider apparatus, and then send the screenshot log stored in the first storage device to the error solution information provider apparatus.

5 Claims, 9 Drawing Sheets

(56) References Cited

U.S. PATENT DOCUMENTS

2014/0368856 A1* 12/2014 Yoon .................. H04N 1/00896
                                                        358/1.13
2018/0336485 A1* 11/2018 Bikumala ................ G06N 5/04
2019/0377657 A1* 12/2019 McCauley .......... G06F 11/0778

* cited by examiner

ERROR SOLUTION INFORMATION PROVIDING SYSTEM, ERROR SOLUTION INFORMATION PROVIDER APPARATUS, AND ELECTRONIC APPARATUS

CROSS-REFERENCE TO RELATED PATENT APPLICATION

This application claims the benefit of Japanese Priority Patent Application JP 2019-060099 filed Mar. 27, 2019, the entire contents of which are incorporated herein by reference.

FIELD OF THE DISCLOSURE

The present disclosure relates to an error solution information provider apparatus configured to provide error solution information to an electronic apparatus in which an error occurred. The present disclosure further relates to the electronic apparatus. The present disclosure further relates to an error solution information providing system including the electronic apparatus and the error solution information provider apparatus.

BACKGROUND OF THE DISCLOSURE

There is known an error solution information provider apparatus configured to provide error solution information to an electronic apparatus in which an error occurred.

SUMMARY OF THE DISCLOSURE

It is desirable to appropriately provide error solution information to an electronic apparatus in which an error occurred.

According to an embodiment of the present disclosure, there is provided an error solution information providing system, including:
an electronic apparatus including an input device, a first display device, a first storage device, and a first controller circuit;
an error solution information provider apparatus including a second controller circuit, the error solution information provider apparatus being communicably connected to the electronic apparatus; and
a database apparatus including a second storage device, the database apparatus being communicably connected to the error solution information provider apparatus,
the first controller circuit of the electronic apparatus being configured to
in a period from returning from an energy-saving mode to determining to change to the energy-saving mode, capture screenshot data every time the first controller circuit detects input from a user into the input device, the screenshot data being data of a screen displayed on the first display device,
determine an error code, the error code identifying an error that occurred in the period, and
generate a screenshot log and store the screenshot log in the first storage device, the screenshot log including a series of the screenshot data in the period and the error code identifying the error that occurred in the period,
the second controller circuit of the error solution information provider apparatus being configured to
detect that the error occurred in the electronic apparatus, and then
send a screenshot log send request to the electronic apparatus, the screenshot log send request requesting to send the screenshot log,
the first controller circuit of the electronic apparatus being configured to
receive the screenshot log send request from the error solution information provider apparatus, and then
send the screenshot log stored in the first storage device to the error solution information provider apparatus,
the second controller circuit of the error solution information provider apparatus being configured to
receive the screenshot log from the electronic apparatus,
send error solution information to the electronic apparatus, the error solution information being stored in the second storage device in association with at least a part of the series of screenshot data and the error code included in the screenshot log, the error solution information being information for a solution to the error identified by the error code, and
send a screenshot log delete request to the electronic apparatus, the screenshot log delete request requesting to delete the screenshot log stored in the first storage device.

According to an embodiment of the present disclosure, there is provided an error solution information provider apparatus communicably connected to
an electronic apparatus including an input device, a first display device, a first storage device, and a first controller circuit, and
a database apparatus including a second storage device,
the error solution information provider apparatus including:
a second controller circuit,
the first controller circuit of the electronic apparatus being configured to
in a period from returning from an energy-saving mode to determining to change to the energy-saving mode, capture screenshot data every time the first controller circuit detects input from a user into the input device, the screenshot data being data of a screen displayed on the first display device,
determine an error code, the error code identifying an error that occurred in the period, and
generate a screenshot log and store the screenshot log in the first storage device, the screenshot log including a series of the screenshot data in the period and the error code identifying the error that occurred in the period,
the second controller circuit of the error solution information provider apparatus being configured to
detect that the error occurred in the electronic apparatus, and then
send a screenshot log send request to the electronic apparatus, the screenshot log send request requesting to send the screenshot log,
the first controller circuit of the electronic apparatus being configured to
receive the screenshot log send request from the error solution information provider apparatus, and then
send the screenshot log stored in the first storage device to the error solution information provider apparatus,
the second controller circuit of the error solution information provider apparatus being configured to
receive the screenshot log from the electronic apparatus, send error solution information to the electronic apparatus, the error solution information being stored in the second storage device in association with at least a part of the series of screenshot data and the error code included in the screenshot log, the error solution information being information for a solution to the error identified by the error code, and send a screenshot log delete request to the electronic apparatus, the screenshot log delete request requesting to delete the screenshot log stored in the first storage device.

According to an embodiment of the present disclosure, there is provided an electronic apparatus communicably connected to a database apparatus including a second storage device, and an error solution information provider apparatus including a second controller circuit, the electronic apparatus including:

an input device;

a first display device;

a first storage device; and a first controller circuit, the first controller circuit of the electronic apparatus being configured to in a period from returning from an energy-saving mode to determining to change to the energy-saving mode, capture screenshot data every time the first controller circuit detects input from a user into the input device, the screenshot data being data of a screen displayed on the first display device, determine an error code, the error code identifying an error that occurred in the period, and generate a screenshot log and store the screenshot log in the first storage device, the screenshot log including a series of the screenshot data in the period and the error code identifying the error that occurred in the period, the second controller circuit of the error solution information provider apparatus being configured to detect that the error occurred in the electronic apparatus, and then send a screenshot log send request to the electronic apparatus, the screenshot log send request requesting to send the screenshot log, the first controller circuit of the electronic apparatus being configured to receive the screenshot log send request from the error solution information provider apparatus, and then send the screenshot log stored in the first storage device to the error solution information provider apparatus, the second controller circuit of the error solution information provider apparatus being configured to receive the screenshot log from the electronic apparatus, send error solution information to the electronic apparatus, the error solution information being stored in the second storage device in association with at least a part of the series of screenshot data and the error code included in the screenshot log, the error solution information being information for a solution to the error identified by the error code, and send a screenshot log delete request to the electronic apparatus, the screenshot log delete request requesting to delete the screenshot log stored in the first storage device.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. Error Solution Information Providing System

Figure 1:
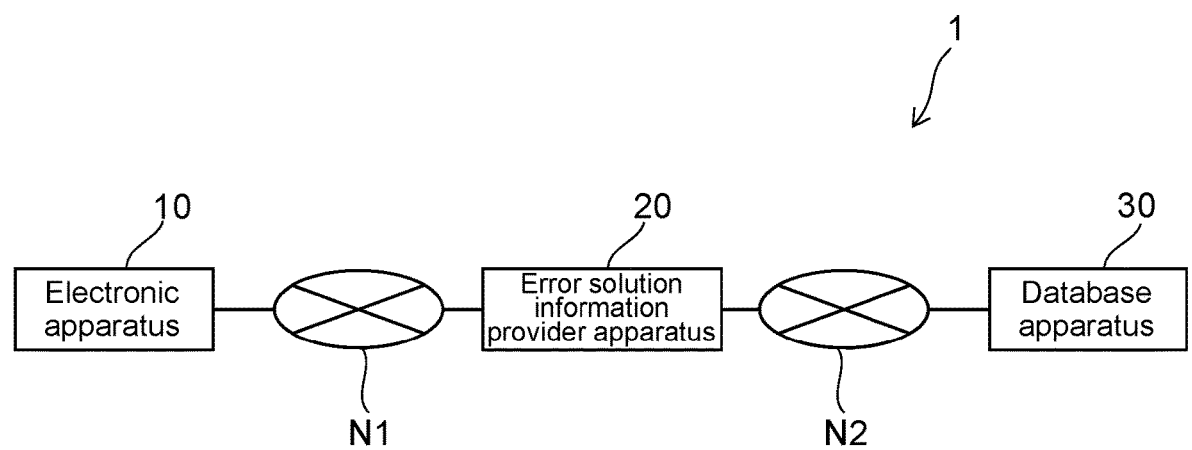
FIG. 1 shows an error solution information providing system according to an embodiment of the present disclosure.

FIG. 1 shows an error solution information providing system according to an embodiment of the present disclosure.

The error solution information providing system 1 includes the electronic apparatus 10, the error solution information provider apparatus 20, and the database apparatus 30. The electronic apparatus 10 is communicably connected to the error solution information provider apparatus 20 via the network N1 such as the Internet. The error solution information provider apparatus 20 is communicably connected to the database apparatus 30 via the network N2 such as the Internet or a LAN. Hereinafter, the networks N1 and N2 will be simply denoted by and referred to as the network N. The error solution information providing system 1 may include multiple electronic apparatuses 10 and multiple error solution information provider apparatuses 20. In the present embodiment, the error solution information providing system 1 includes the single electronic apparatus 10 and the single error solution information provider apparatus 20.

An end user uses the electronic apparatus 10. The electronic apparatus 10 includes a display device (display or touch panel). The electronic apparatus 10 is, for example, an image forming apparatus (MFP, Multifunction Peripheral).

An operator, who works for a support service for the electronic apparatus 10, uses the error solution information provider apparatus 20. The error solution information provider apparatus 20 is, for example, a personal computer, a tablet computer, or the like. The error solution information provider apparatus 20 provides error solution information to the electronic apparatus 10 in which an error occurred.

The database apparatus 30 stores error solution information that the error solution information provider apparatus 20 provides to the electronic apparatus 10.

Where there is the single error solution information provider apparatus 20, the error solution information provider apparatus 20 and the database apparatus 30 may be a single information processing apparatus. In other words, the error solution information provider apparatus 20 may include the database apparatus 30, which is a local storage device. However, where there are multiple error solution information provider apparatuses 20, the database apparatus 30 should be independent of the multiple error solution information provider apparatuses 20 such that the common database apparatus 30 is accessible from the multiple error solution information provider apparatuses 20.

2. Hardware Configuration of Electronic Apparatus

Figure 2:
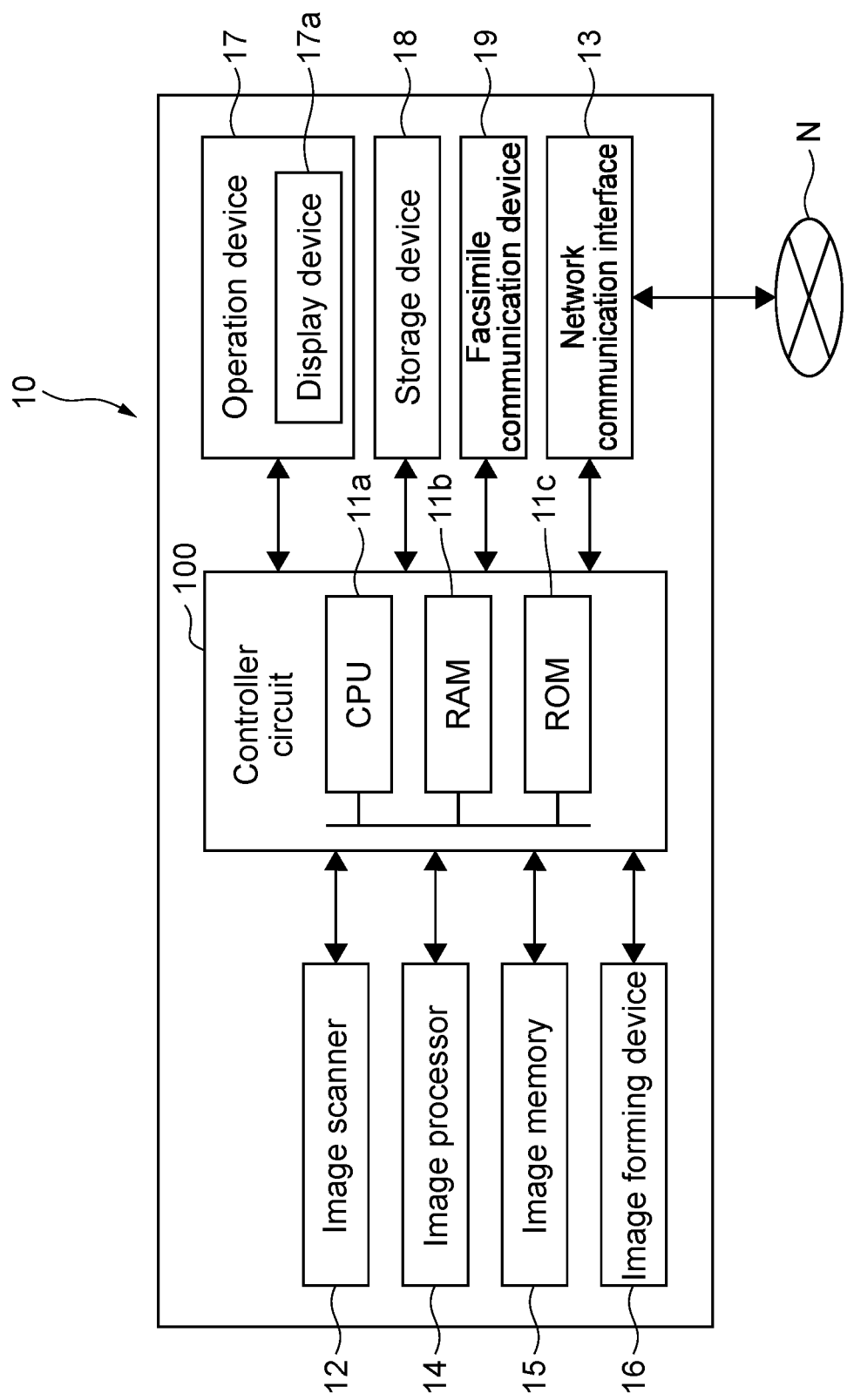
FIG. 2 shows a hardware configuration of an electronic apparatus.

FIG. 2 shows a hardware configuration of an electronic apparatus.

A hardware configuration of the electronic apparatus 10, i.e., an image forming apparatus, will be described. The electronic apparatus 10 includes the controller circuit 100. The controller circuit 100 includes the CPU (Central Processing Unit) 11a, the RAM (Random Access Memory) 11b, the ROM (Read Only Memory) 11c, dedicated hardware circuits, and the like and performs overall operational control of the electronic apparatus 10. The CPU 11a loads information processing programs stored in the ROM 11c in the RAM 11b and executes the information processing programs. The ROM 11c is a nonvolatile memory that stores programs executable by the CPU 11a, data, and the like. The ROM 11c is an example of a non-transitory computer readable recording medium.

The controller circuit 100 is connected to the image scanner 12, the image processor 14 (including GPU (Graphics Processing Unit)), the image memory 15, the image forming device 16 (printer), the operation device 17 including the display device 17a (touch panel), the large volume nonvolatile storage device 18 such as an HDD (Hard Disk Drive) or an SSD (Solid State Drive), the facsimile communication device 19, the network communication interface 13, and the like. The controller circuit 100 performs operational control of the respective devices connected thereto and sends/receives signals and data to/from those devices. The operation device 17 (touch panel) is one mode of an input device. A sound input device including a microphone may be provided as an input device.

3. Hardware Configuration of Error Solution Information Provider Apparatus

Figure 3:
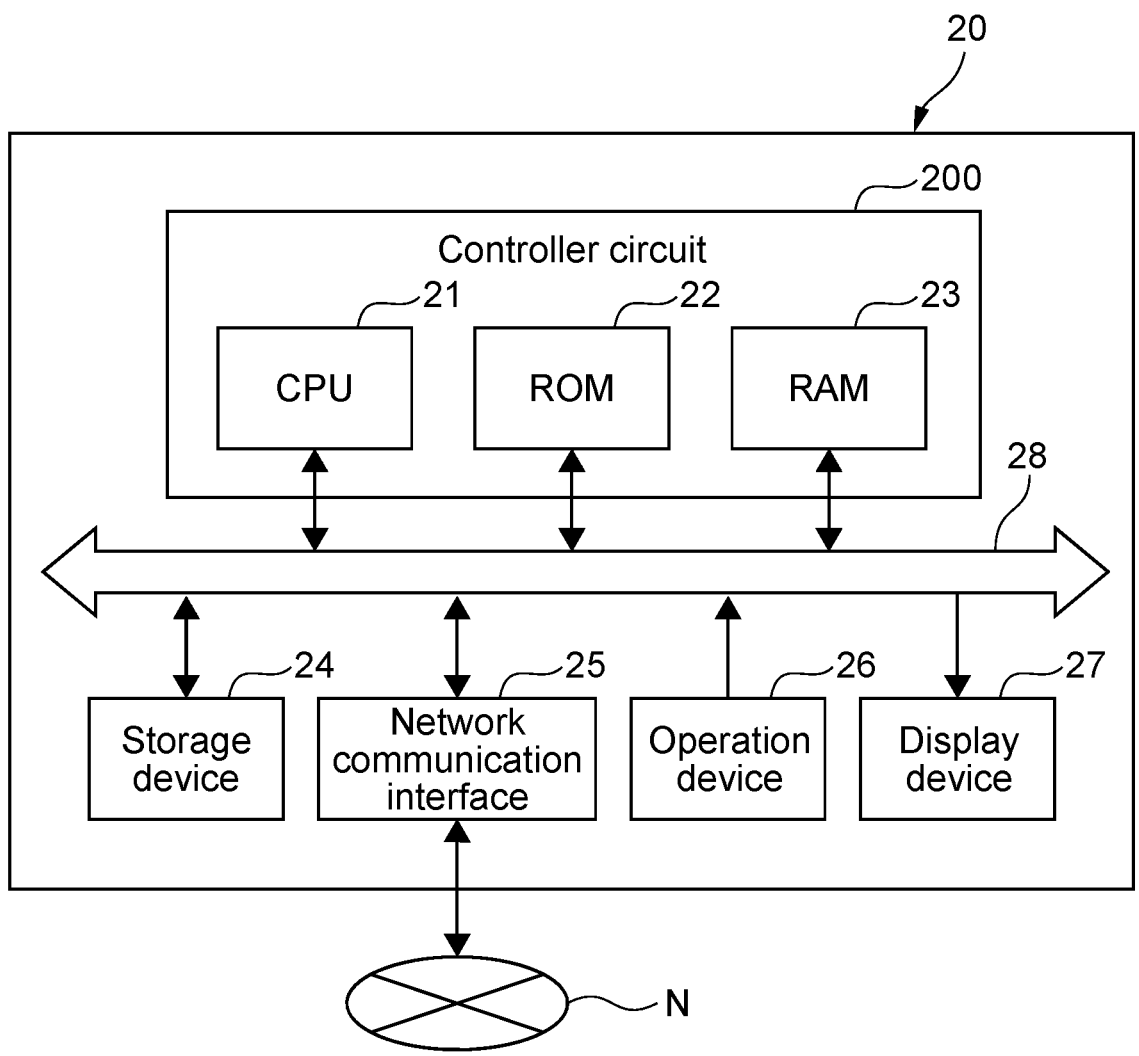
FIG. 3 shows a hardware configuration of an error solution information provider apparatus.

FIG. 3 shows a hardware configuration of an error solution information provider apparatus.

The error solution information provider apparatus 20 includes the CPU 21, the ROM 22, the RAM 23, the storage device 24, which is a large-volume nonvolatile memory such as an HDD or an SSD, the network communication interface 25, the operation device 26, and the display device 27, and the bus 28 connecting them to each other.

The controller circuit 200 includes the CPU 21, the ROM 22, and the RAM 23. The CPU 21 loads information processing programs stored in the ROM 22 in the RAM 23 and executes the information processing programs. The ROM 22 stores programs executable by the CPU 21, data, and the like nonvolatile. The ROM 22 is an example of a non-transitory computer readable recording medium.

4. Hardware Configuration of Database Apparatus

Figure 4:
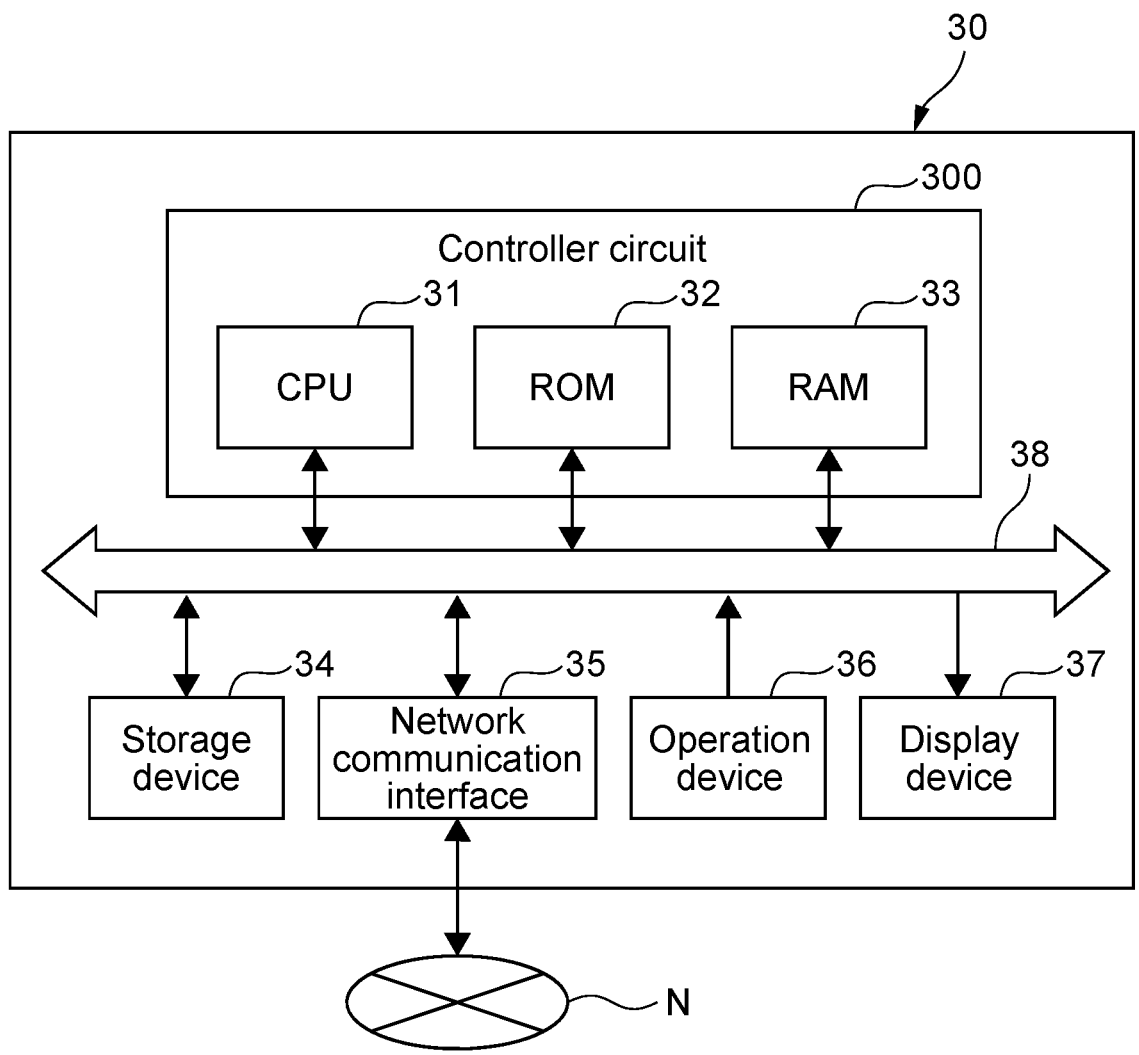
FIG. 4 shows a hardware configuration of a database apparatus.

FIG. 4 shows a hardware configuration of a database apparatus.

The database apparatus 30 includes the CPU 31, the ROM 32, the RAM 33, the storage device 34, which is a large-volume nonvolatile memory such as an HDD or an SSD, the network communication interface 35, the operation device 36, and the display device 37, and the bus 38 connecting them to each other.

The controller circuit 300 includes the CPU 31, the ROM 32, and the RAM 33. The CPU 31 loads information processing programs stored in the ROM 32 in the RAM 33 and executes the information processing programs. The ROM 32 stores programs executable by the CPU 31, data, and the like nonvolatile. The ROM 32 is an example of a non-transitory computer readable recording medium.

5. Functional Configuration of Error Solution Information Providing System

Figure 5:
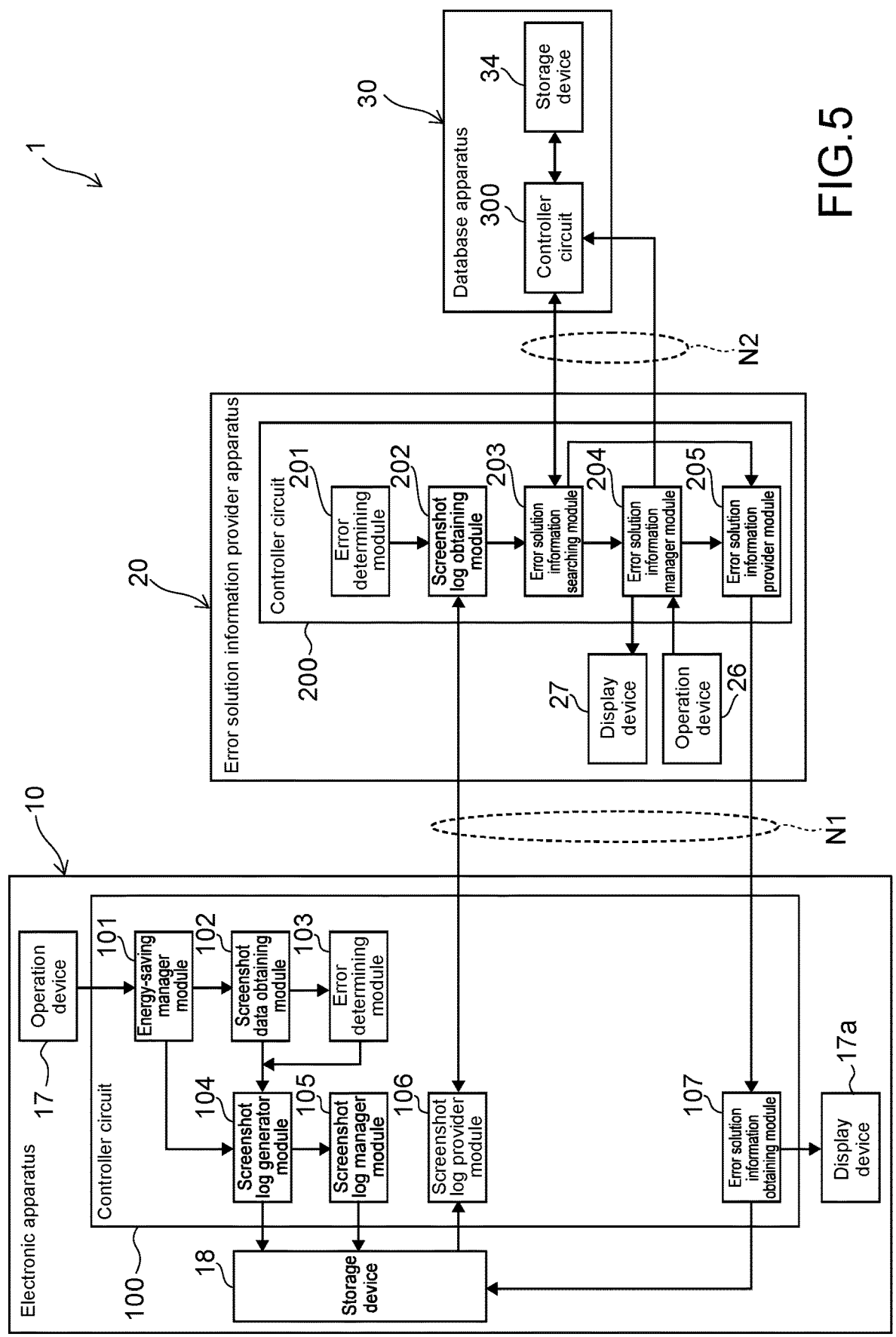
FIG. 5 shows a functional configuration of the error solution information providing system.

FIG. 5 shows a functional configuration of the error solution information providing system.

In the controller circuit 100 of the electronic apparatus 10, the CPU 11a loads an information processing program stored in the ROM 11c in the RAM 11b and executes the information processing program to operate as the energy-saving manager module 101, the screenshot data obtaining module 102, the error determining module 103, the screenshot log generator module 104, the screenshot log manager module 105, the screenshot log provider module 106, and the error solution information obtaining module 107.

In the controller circuit 200 of the error solution information provider apparatus 20, the CPU 21 loads an information processing program stored in the ROM 22 in the RAM 23 and executes the information processing program to operate as the error determining module 201, the screenshot log obtaining module 202, the error solution information searching module 203, the error solution information manager module 204, and the error solution information provider module 205.

6. Information Stored in Database Apparatus

Figure 6:
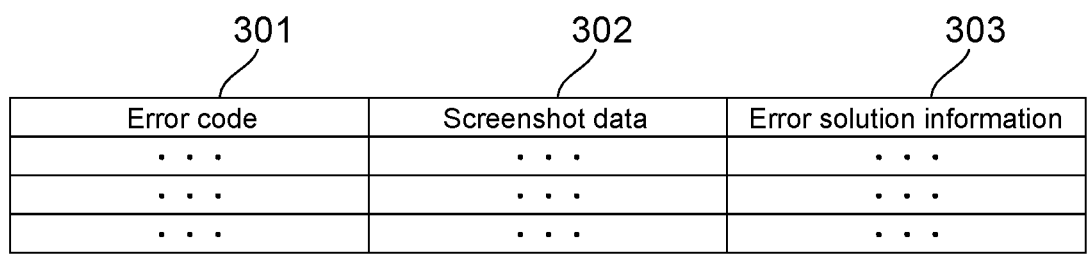
FIG. 6 schematically shows information stored in the database apparatus.

FIG. 6 schematically shows information stored in the database apparatus.

The storage device 34 (second storage device) of the database apparatus 30 stores the error code 301, the series of screenshot data 302, and the error solution information 303 in association with each other.

The error code 301 identifies an error that occurs in the electronic apparatus 10.

The series of screenshot data 302 is a series of screenshot data included in a screenshot log generated by the electronic apparatus 10 when the error, which is identified by the error code 301, occurred in the electronic apparatus 10.

The error solution information 303 is information for a solution to the error, which is identified by the error code 301, occurred when a series of screens was displayed based on the series of screenshot data 302 on the display device 17a of the electronic apparatus 10. The error solution information 303 shows, for example, a procedure and the like for operation of the operation device 17 of the electronic apparatus 10.

7. Operational Flow of Error Solution Information Providing System

Figure 7:
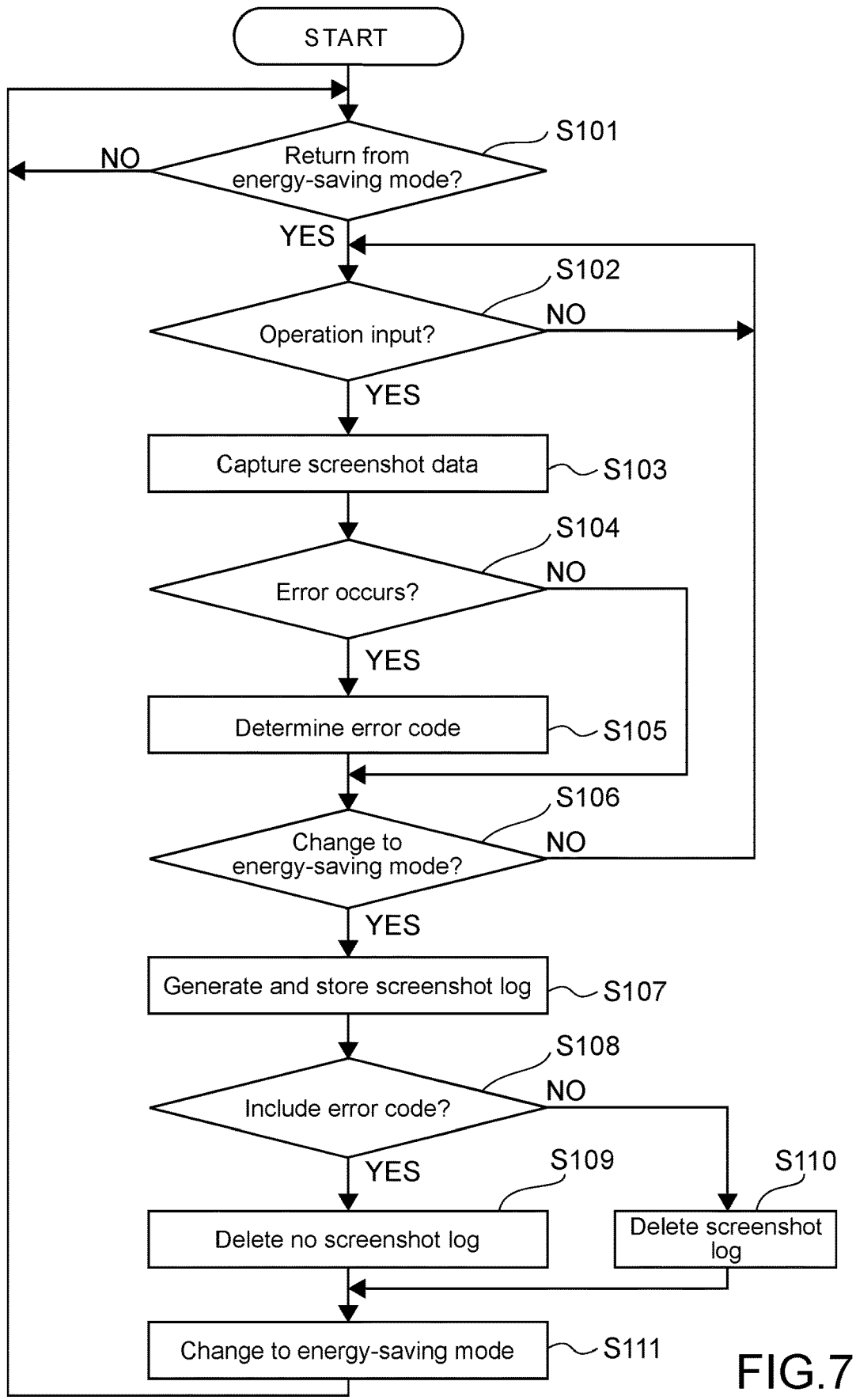
FIG. 7 shows a first operational flow of the electronic apparatus.

FIG. 7 shows a first operational flow of the electronic apparatus.

A precondition for the operational flow will be described. The electronic apparatus 10 is configured to exclusively execute an energy-saving mode and a normal mode. Where the electronic apparatus 10 detects a certain trigger (for example, the operation device 17 is not operated for a certain time period) in the normal mode, the electronic apparatus 10 changes from the normal mode to the energy-saving mode. Meanwhile, where the electronic apparatus 10 detects a certain trigger (for example, the operation device 17 is operated) in the energy-saving mode, the electronic apparatus 10 returns from the energy-saving mode to the normal mode. The electronic apparatus 10 executes the energy-saving mode now.

The energy-saving manager module 101 of the electronic apparatus 10 detects the certain trigger (for example, the operation device 17 is operated) in the energy-saving mode. The energy-saving manager module 101 causes the electronic apparatus 10 to return from the energy-saving mode to the normal mode (Step S101, YES).

After the electronic apparatus 10 returns from the energy-saving mode to the normal mode, every time input in the operation device 17 (input device) is detected (Step S102, YES), the screenshot data obtaining module 102 of the electronic apparatus 10 captures data (screenshot data) of a screen displayed on the display device 17a (first display device) (Step S103). The screenshot data obtaining module 102 keeps on capturing screenshot data in the normal mode (Step S106, NO).

After the electronic apparatus 10 returns from the energy-saving mode to the normal mode, where an error occurs in the normal mode (Step S104, YES), the error determining module 103 of the electronic apparatus 10 determines an error code identifying the error that occurred (Step S105).

Where the certain trigger (for example, the operation device 17 is not operated for a certain time period) is detected in the normal mode, the energy-saving manager module 101 of the electronic apparatus 10 determines to change to the energy-saving mode (Step S106, YES).

The screenshot log generator module 104 of the electronic apparatus 10 generates a screenshot log including the series of screenshot data (Step S103), which is captured by the screenshot data obtaining module 102 in a period from returning from the energy-saving mode (Step S101) to determining to change to the energy-saving mode (Step S106, YES), and an error code of the error which occurred in the period (Step S105). The screenshot log generator module 104 stores the generated screenshot log in the storage device 18 (first storage device) (Step S107). Note that, where no error occurs in the period, the screenshot log includes no error code.

The screenshot log manager module 105 of the electronic apparatus 10 determines whether or not the screenshot log stored in the storage device 18 includes an error code (Step S108). Where the screenshot log manager module 105 determines that the screenshot log includes an error code (Step S108, YES), the screenshot log manager module 105 deletes no screenshot log from the storage device 18 (i.e., keeps on storing screenshot log) (Step S109).

Meanwhile, where the screenshot log manager module 105 of the electronic apparatus 10 determines that the screenshot log includes no error code (Step S108, NO), the screenshot log manager module 105 deletes the screenshot log from the storage device 18 (Step S110).

After that, the energy-saving manager module 101 of the electronic apparatus changes from the normal mode to the energy-saving mode (Step S111).

Figure 8:
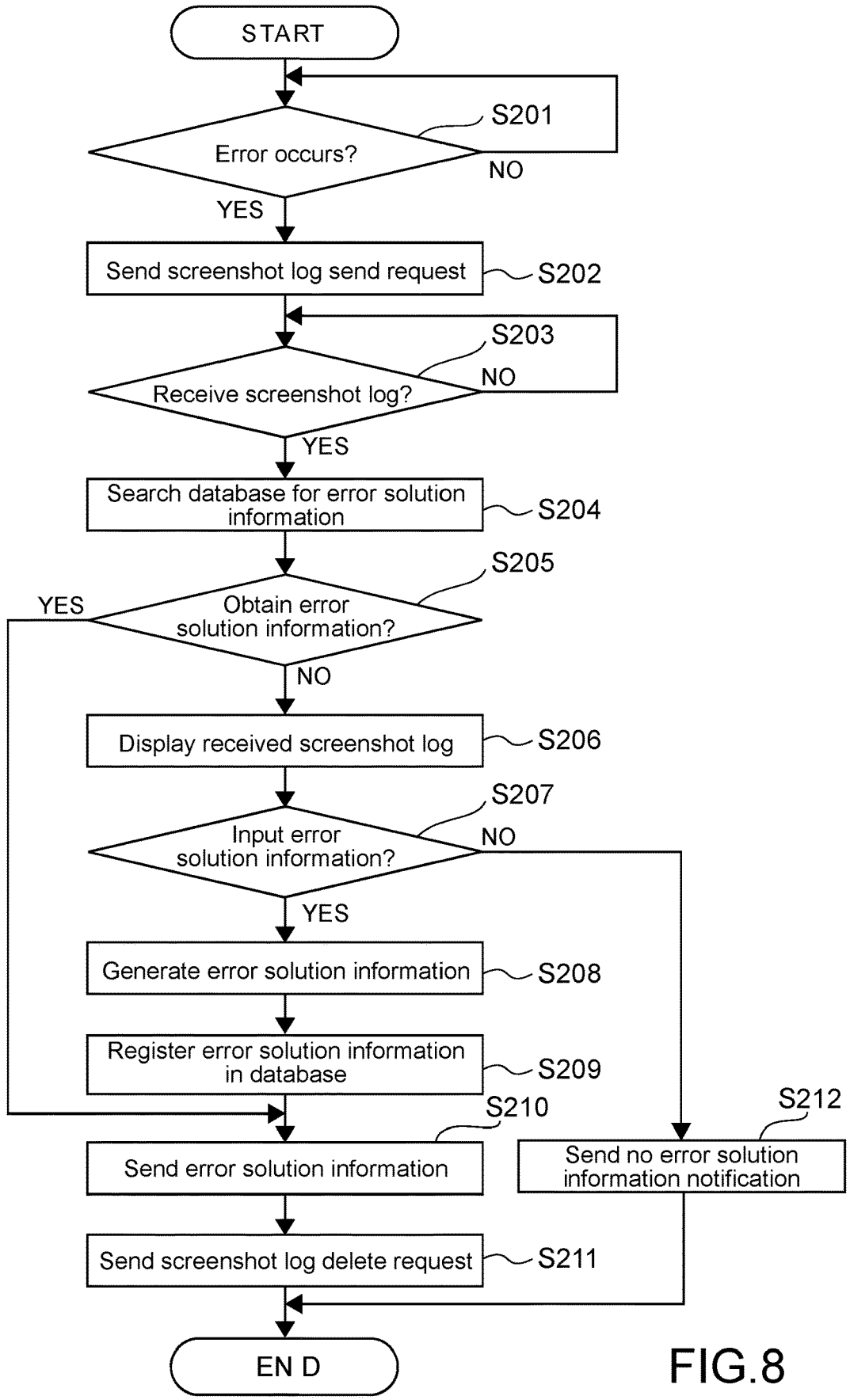
FIG. 8 shows an operational flow of the error solution information provider apparatus.

FIG. 8 shows an operational flow of the error solution information provider apparatus.

The error determining module 201 of the error solution information provider apparatus 20 detects that an error occurred in the electronic apparatus 10, and determines the error code of the error that occurred (Step S201, YES). An error detection method may be an arbitrary method. For example, the error solution information provider apparatus 20 may monitor the electronic apparatus 10 at regular intervals to detect an error. Alternatively, when an error occurs, the electronic apparatus 10 may notify the error solution information provider apparatus 20 that an error occurred.

The screenshot log obtaining module 202 of the error solution information provider apparatus 20 sends, to the electronic apparatus 10, a request (screenshot log send request) to send a screenshot log including the determined error code (Step S202).

Figure 9:
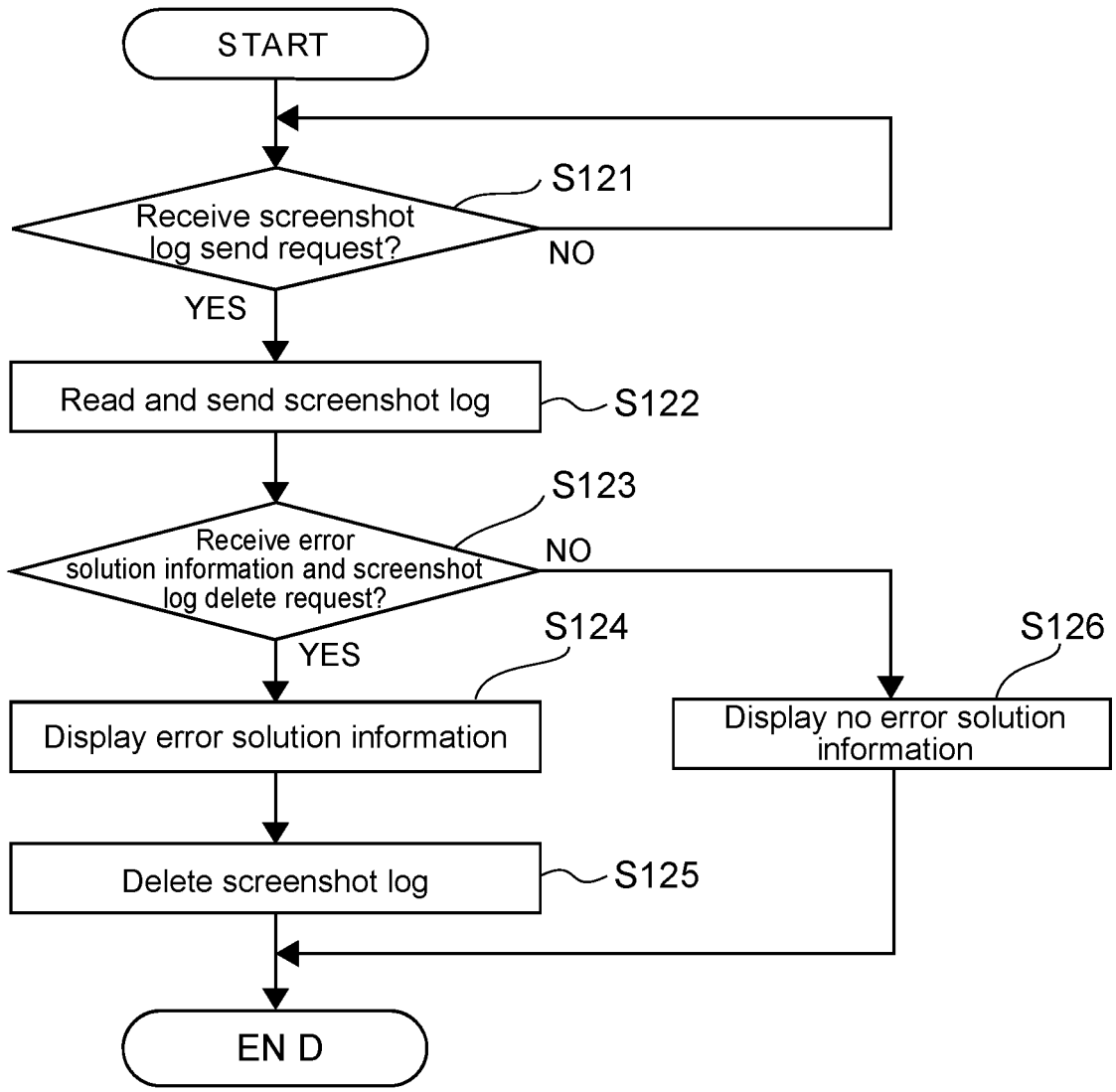
FIG. 9 shows a second operational flow of the electronic apparatus.

FIG. 9 shows a second operational flow of the electronic apparatus.

The screenshot log provider module 106 of the electronic apparatus 10 receives the screenshot log send request from the error solution information provider apparatus 20 (Step S121, YES). The screenshot log provider module 106 determines an error code specified by the received screenshot log send request. The screenshot log provider module 106 reads a screenshot log, which includes the determined error code and a series of image data, from the storage device 18. The screenshot log provider module 106 sends the screenshot log to the error solution information provider apparatus 20 (Step S122).

The screenshot log obtaining module 202 of the error solution information provider apparatus 20 receives the screenshot log, which includes the error code and the series of image data, from the electronic apparatus 10 (Step S203, YES).

The error solution information searching module 203 of the error solution information provider apparatus 20 searches the database apparatus 30 for error solution information, which is in association with at least a part of the series of screenshot data and the error code included in the received screenshot log (Step S204).

The database apparatus 30 may or may not store error solution information, which is in association with at least a part of the series of screenshot data and the error code included in the screenshot log received by the error solution information provider apparatus 20.

Where the database apparatus 30 stores error solution information, the error solution information searching module 203 of the error solution information provider apparatus 20 obtains the error solution information from the database apparatus 30 as a result of the search (Step S205, YES).

Meanwhile, where the database apparatus 30 stores no error solution information, the error solution information searching module 203 of the error solution information provider apparatus 20 is incapable of obtaining error solution information from the database apparatus 30 as a result of the search (Step S205, NO).

Where no error solution information is obtained (Step S205, NO), the error solution information manager module 204 of the error solution information provider apparatus 20 displays on the display device 27, in a time series, a series of screens based on the series of screenshot data included in the screenshot log received from the electronic apparatus 10 (Step S206).

With reference to the series of screens displayed on the display device 27, a user (who works for a support service for the electronic apparatus 10) inputs, in the error solution information manager module 204 via the operation device 26, information for a solution to the error identified by the error code included in the screenshot log received from the electronic apparatus 10 (Step S207, YES). The error solution information manager module 204 generates error solution information based on the information input by the user (Step S208). The error solution information manager module 204 registers the generated error solution information, and the error code and the series of screenshot data included in the screenshot log received from the electronic apparatus 10, in association with each other in the database apparatus 30 (Step S209).

Meanwhile, a user may not determine information for a solution to an error depending on content of a series of screens and the error. In this case, the user may input no information for a solution to the error, and the error solution information manager module 204 thereby generates no error solution information (Step S207, NO).

The error solution information provider module 205 of the error solution information provider apparatus 20 sends the error solution information obtained from the database apparatus 30 (Step S205, YES) or the newly generated error solution information (Step S208) to the electronic apparatus 10 (Step S210). The error solution information provider module 205 further sends, to the electronic apparatus 10, a request (screenshot log delete request) to delete, from the storage device 18, the screenshot log (Step S122) sent from the electronic apparatus 10 to the error solution information provider apparatus 20 (Step S211).

Meanwhile, where error solution information is not generated (Step S207, NO), the error solution information provider module 205 of the error solution information provider apparatus 20 sends a notification (no error solution information notification), which indicates that no error solution information is generated, to the electronic apparatus 10, and sends no screenshot log delete request to the electronic apparatus 10 (Step S212).

The error solution information obtaining module 107 of the electronic apparatus 10 receives the error solution information (Step S210) and the screenshot log delete request (Step S211) from the error solution information provider apparatus (Step S123, YES). The error solution information obtaining module 107 displays the received error solution information on the display device 17a (Step S124). As a result, a user (end user) operates the operation device 17 of the electronic apparatus 10 to try error solution. In response to the screenshot log delete request, the error solution information obtaining module 107 further deletes, from the storage device 18, the screenshot log (Step S122) sent from the electronic apparatus 10 to the error solution information provider apparatus 20 (Step S125).

Meanwhile, the error solution information obtaining module 107 of the electronic apparatus 10 receives no error solution information notification (Step S212) from the error solution information provider apparatus 20 (Step S123, NO). The error solution information obtaining module 107 displays on the display device 17a that there is no error solution information and no error solution information is generated (Step S126).

8. Conclusion (1) According to the present embodiment, in a period from returning from an energy-saving mode to determining to change to the energy-saving mode, the electronic apparatus 10 captures screenshot data every time the first controller circuit detects input from a user (Steps S101-S106). Where the error solution information provider apparatus 20 detects that the error occurred in the electronic apparatus 10, the error solution information provider apparatus 20 receive a screenshot log from the electronic apparatus 10 (Steps S201-S203). In other words, the electronic apparatus 10 keeps on capturing screenshot data from time before the error solution information provider apparatus 20 detects an error continuously. As a result, the error solution information provider apparatus 20 is capable of receiving a screenshot log including screenshot data from time before the error is detected. As a result, the error solution information provider apparatus 20 may send error solution information to the electronic apparatus 10 more appropriately than a case, in which error solution information based on a screenshot log only including screenshot data only after the error is detected is sent to the electronic apparatus 10. Further, according to the present embodiment, the error solution information provider apparatus 20 sends a screenshot log delete request to the electronic apparatus 10 in addition to the error solution information (Steps S210-S211). As a result, where there is error solution information, the electronic apparatus 10 deletes a screenshot log when an error occurred. So the volume of data in the storage device 18 may be reduced.

(2) According to the present embodiment, where the database apparatus 30 stores no error solution information (Step S205, NO), the error solution information provider apparatus 20 generates error solution information based on a series of screenshot data, registers the error solution information in the database apparatus 30, and sends the error solution information to the electronic apparatus 10 (Steps S208-S210). As a result, where there is no error solution information, the error solution information provider apparatus 20 generates error solution information appropriately, and sends the error solution information to the electronic apparatus 10. In addition, since the error solution information provider apparatus 20 registers the error solution information in the database apparatus 30, the error solution information will be provided to the electronic apparatus 10 where a similar error occurs in the future.

(3) According to the present embodiment, where no error solution information is generated, the error solution information provider apparatus 20 sends no screenshot log delete request to the electronic apparatus 10 (Step S207, NO, and S212). As a result, the electronic apparatus 10 stores only a screenshot log, with which an error with no error solution information occurred, i.e., only a necessary screenshot log.

(4) According to the present embodiment, the first controller circuit of the electronic apparatus 10 deletes a screenshot log including no error code, and then changes to the energy-saving mode (Steps S110-S111). As a result, the electronic apparatus 10 may reduce the volume of data in the storage device 18.

It should be understood by those skilled in the art that various modifications, combinations, sub-combinations and alterations may occur depending on design requirements and other factors insofar as they are within the scope of the appended claims or the equivalents thereof

What is claimed is:

1. An error solution information providing system, comprising:
    an electronic apparatus including an input device, a first display device, a first storage device, and a first controller circuit;

an error solution information provider apparatus including a second controller circuit, the error solution information provider apparatus being communicably connected to the electronic apparatus; and a database apparatus including a second storage device, the database apparatus being communicably connected to the error solution information provider apparatus, the first controller circuit of the electronic apparatus being configured to in a period from returning from an energy-saving mode to determining to change to the energy-saving mode, capture screenshot data every time the first controller circuit detects input from a user into the input device, the screenshot data being data of a screen displayed on the first display device, determine an error code, the error code identifying an error that occurred in the period, and generate a screenshot log and store the screenshot log in the first storage device, the screenshot log including a series of the screenshot data in the period and the error code identifying the error that occurred in the period, the second controller circuit of the error solution information provider apparatus being configured to detect that the error occurred in the electronic apparatus, and then send a screenshot log send request to the electronic apparatus, the screenshot log send request requesting to send the screenshot log, the first controller circuit of the electronic apparatus being configured to receive the screenshot log send request from the error solution information provider apparatus, and then send the screenshot log stored in the first storage device to the error solution information provider apparatus, the second controller circuit of the error solution information provider apparatus being configured to receive the screenshot log from the electronic apparatus, send error solution information to the electronic apparatus, the error solution information being stored in the second storage device in association with at least a part of the series of screenshot data and the error code included in the screenshot log, the error solution information being information for a solution to the error identified by the error code, and send a screenshot log delete request to the electronic apparatus, the screenshot log delete request requesting to delete the screenshot log stored in the first storage device, wherein the first controller circuit of the electronic apparatus is configured to where no error occurs in the period, generate a screenshot log and store the screenshot log in the first storage device, the screenshot log including the series of screenshot data in the period and no error code, and where the first controller circuit determines to change to the energy-saving mode, where the screenshot log stored in the first storage device includes the error code, delete no screenshot log from the first storage device and change to the energy-saving mode, and where the screenshot log stored in the first storage device includes no error code, delete the screenshot log from the first storage device and then change to the energy-saving mode.

2. The error solution information providing system according to claim 1, wherein the second controller circuit of the error solution information provider apparatus is configured to where the second storage device stores no error solution information in association with at least a part of the series of screenshot data and the error code included in the screenshot log, generate error solution information for a solution to the error that occurred when a series of screens was displayed based on the series of screenshot data, store the error solution information in the second storage device in association with the series of screenshot data and the error code included in the screenshot log, send the generated error solution information to the electronic apparatus, and send the screenshot log delete request to the electronic apparatus.

3. The error solution information providing system according to claim 2, wherein the second controller circuit of the error solution information provider apparatus is configured to where the second controller circuit generates no error solution information for a solution to the error that occurred when a series of screens was displayed based on the series of screenshot data, send a notification to the electronic apparatus, the notification indicating that no error solution information is generated, and send no screenshot log delete request to the electronic apparatus.

4. An error solution information provider apparatus communicably connected to an electronic apparatus including an input device, a first display device, a first storage device, and a first controller circuit, and a database apparatus including a second storage device, the error solution information provider apparatus comprising:

a second controller circuit, the first controller circuit of the electronic apparatus being configured to in a period from returning from an energy-saving mode to determining to change to the energy-saving mode, capture screenshot data every time the first controller circuit detects input from a user into the input device, the screenshot data being data of a screen displayed on the first display device, determine an error code, the error code identifying an error that occurred in the period, and generate a screenshot log and store the screenshot log in the first storage device, the screenshot log including a series of the screenshot data in the period and the error code identifying the error that occurred in the period, the second controller circuit of the error solution information provider apparatus being configured to detect that the error occurred in the electronic apparatus, and then send a screenshot log send request to the electronic apparatus, the screenshot log send request requesting to send the screenshot log, the first controller circuit of the electronic apparatus being configured to receive the screenshot log send request from the error solution information provider apparatus, and then send the screenshot log stored in the first storage device to the error solution information provider apparatus, the second controller circuit of the error solution information provider apparatus being configured to receive the screenshot log from the electronic apparatus, send error solution information to the electronic apparatus, the error solution information being stored in the second storage device in association with at least a part of the series of screenshot data and the error code included in the screenshot log, the error solution information being information for a solution to the error identified by the error code, and send a screenshot log delete request to the electronic apparatus, the screenshot log delete request requesting to delete the screenshot log stored in the first storage device, wherein the first controller circuit of the electronic apparatus is configured to where no error occurs in the period, generate a screenshot log and store the screenshot log in the first storage device, the screenshot log including the series of screenshot data in the period and no error code, and where the first controller circuit determines to change to the energy-saving mode where the screenshot log stored in the first storage device includes the error code, delete no screenshot log from the first storage device and change to the energy-saving mode, and where the screenshot log stored in the first storage device includes no error code, delete the screenshot log from the first storage device and then change to the energy-saving mode.

5. An electronic apparatus communicably connected to a database apparatus including a second storage device, and an error solution information provider apparatus including a second controller circuit, the electronic apparatus comprising:

an input device;

a first display device;

a first storage device; and a first controller circuit, the first controller circuit of the electronic apparatus being configured to in a period from returning from an energy-saving mode to determining to change to the energy-saving mode, capture screenshot data every time the first controller circuit detects input from a user into the input device, the screenshot data being data of a screen displayed on the first display device, determine an error code, the error code identifying an error that occurred in the period, and generate a screenshot log and store the screenshot log in the first storage device, the screenshot log including a series of the screenshot data in the period and the error code identifying the error that occurred in the period, the second controller circuit of the error solution information provider apparatus being configured to detect that the error occurred in the electronic apparatus, and then send a screenshot log send request to the electronic apparatus, the screenshot log send request requesting to send the screenshot log, the first controller circuit of the electronic apparatus being configured to receive the screenshot log send request from the error solution information provider apparatus, and then send the screenshot log stored in the first storage device to the error solution information provider apparatus, the second controller circuit of the error solution information provider apparatus being configured to receive the screenshot log from the electronic apparatus, send error solution information to the electronic apparatus, the error solution information being stored in the second storage device in association with at least a part of the series of screenshot data and the error code included in the screenshot log, the error solution information being information for a solution to the error identified by the error code, and send a screenshot log delete request to the electronic apparatus, the screenshot log delete request requesting to delete the screenshot log stored in the first storage device, wherein the first controller circuit of the electronic apparatus is configured to where no error occurs in the period, generate a screenshot log and store the screenshot log in the first storage device, the screenshot log including the series of screenshot data in the period and no error code, and where the first controller circuit determines to change to the energy-saving mode, where the screenshot log stored in the first storage device includes the error code, delete no screenshot log from the first storage device and change to the energy-saving mode, and where the screenshot log stored in the first storage device includes no error code, delete the screenshot log from the first storage device and then change to the energy-saving mode.

* * * * *